(12) United States Patent
Parker et al.

(10) Patent No.: US 8,111,148 B2
(45) Date of Patent: Feb. 7, 2012

(54) METHOD AND APPARATUS FOR BI-DIRECTIONAL COMMUNICATION WITH A MINIATURE CIRCUIT BREAKER

(76) Inventors: Kevin L. Parker, Raleigh, NC (US); Gary B. Pollard, Wendell, NC (US); Gary W. Scott, Mount Vernon, IA (US)

(*) Notice: Subject to any disclaimer, the term of this patent is extended or adjusted under 35 U.S.C. 154(b) by 470 days.

(21) Appl. No.: 12/317,800

(22) Filed: Dec. 30, 2008

(65) Prior Publication Data
US 2010/0164744 A1 Jul. 1, 2010

(51) Int. Cl.
*G08B 1/08* (2006.01)
(52) U.S. Cl. ........ 340/538; 340/635; 340/639; 340/650; 340/657; 700/286; 700/291; 700/295; 700/297

(58) Field of Classification Search .................. 340/538, 340/635, 638, 639, 650, 657; 700/286, 291, 700/295, 297
See application file for complete search history.

(56) References Cited

U.S. PATENT DOCUMENTS

| | | | |
|---|---|---|---|
| 4,964,058 A | 10/1990 | Brown, Jr. | |
| 5,162,664 A | 11/1992 | Haun et al. | |
| 5,821,876 A * | 10/1998 | Farrington et al. | 340/3.2 |
| 5,892,449 A * | 4/1999 | Reid et al. | 340/639 |
| 6,212,049 B1 * | 4/2001 | Spencer et al. | 361/64 |
| 6,356,426 B1 | 3/2002 | Dougherty | |
| 6,868,349 B2 | 3/2005 | Fletcher et al. | |

* cited by examiner

*Primary Examiner* — Tai T Nguyen

(57) ABSTRACT

A wireless electrically isolated plug-n-play communications system for branch circuit breakers. The system providing means for automatically connecting the wireless electrically isolated communication system between the branch circuit breaker and a communications strip as the branch circuit breaker is being installed in the load center.

14 Claims, 6 Drawing Sheets

METHOD AND APPARATUS FOR BI-DIRECTIONAL COMMUNICATION WITH A MINIATURE CIRCUIT BREAKER

CROSS-REFERENCE TO RELATED PATENTS

Not applicable

STATEMENT REGARDING FEDERALLY SPONSORED RESEARCH OR DEVELOPMENT

Not applicable

FIELD OF THE INVENTION

The present invention relates to branch or miniature circuit breakers and residential or commercial load centers and panelboards, and particularly to methods and apparatus for bi-directional non-contact wireless electrically isolated communication between individual branch circuit breakers in a load center or panelboard and a monitoring/control module located either within the load center panelboard or remote from the load center or panelboard.

BACKGROUND OF THE INVENTION

Branch circuit breakers are typically found in load centers, service entrance boxes, auxiliary circuit panels or panelboards of a residence or business. Branch circuit breakers can include, in addition to the standard circuit over current protection feature, one or more additional features such as ground fault detection, arc fault detection, current measurement or remote operation. Typically, ground fault and arc fault detection is performed by current sensing devices and a microprocessor inside the circuit breaker. Remote circuit breaker operation is typically an electric motor or solenoid controlled by a hard-wired connection between the circuit breaker and a remote circuit breaker controller. The hard-wired connection requires additional installation time for the installer and additional wiring, which increases cost and consumes wiring space inside the load center. Control wire is much smaller than typical 12-14 AWG electrical circuit wire and therefore is easily damaged or broken, which can causes additional time for the installer to repair.

SUMMARY OF THE INVENTION

The present invention provides a simple method of two-way electrically isolated communication between a branch circuit breaker and a circuit breaker controller that obtains information about the current conditions of the branch circuit breaker and controls the branch circuit breaker. The two-way wireless communication connection between the branch circuit breaker and the circuit breaker controller is made automatically when the branch circuit breaker is installed in the load center.

BRIEF DESCRIPTION OF THE DRAWINGS

The features of the invention will be more clearly understood from the following detailed description of the invention read together with the drawings in which.

Figure 1:
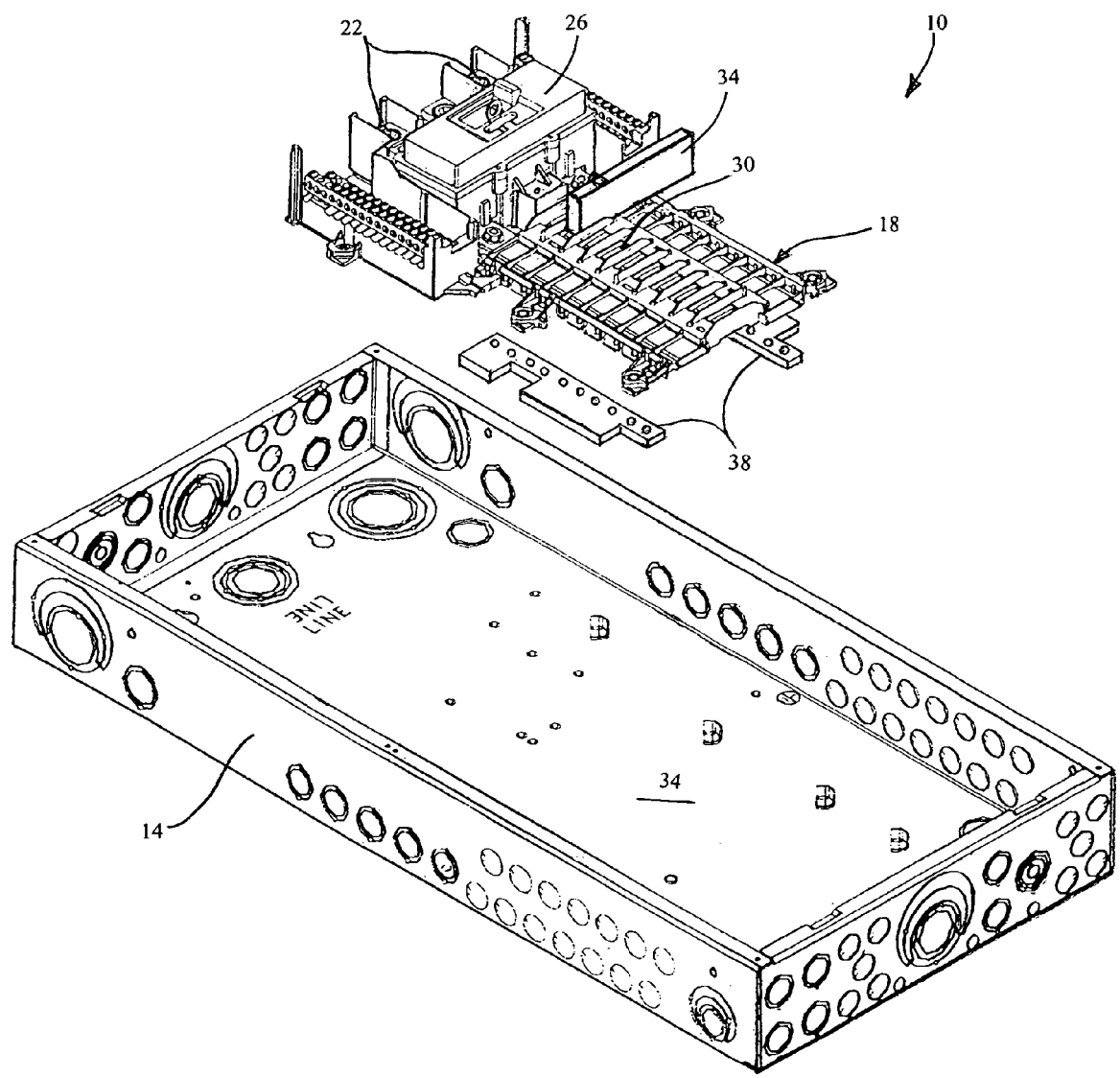
FIG. 1 illustrates in exploded view a load center with communication strips constructed in accordance with the present invention.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

FIG. 1 illustrates in exploded view, a load center generally indicated by reference numeral 10, of the type commonly used in residential and business applications. The load center includes an enclosure 14 that supports and protects a load center interior 18, which serves as a platform for line terminals 22 that receive power from a utility or other power source, an optional main breaker 26, at least one electrical distribution bus 30 and a plurality of branch circuit breakers 34 receiving power from the at least one distribution bus 30. The load center interior 18 is attachable to an back surface 36 of the enclosure 14. Also shown in FIG. 1 is one embodiment of a communication strip 38, of the present invention. In this embodiment one or more communication strips 38 are at least partially captured between the load center interior 18 and the back surface 36 of the enclosure 14 when the interior 18 is attached to the back surface 36 of the enclosure 14.

Figure 2:
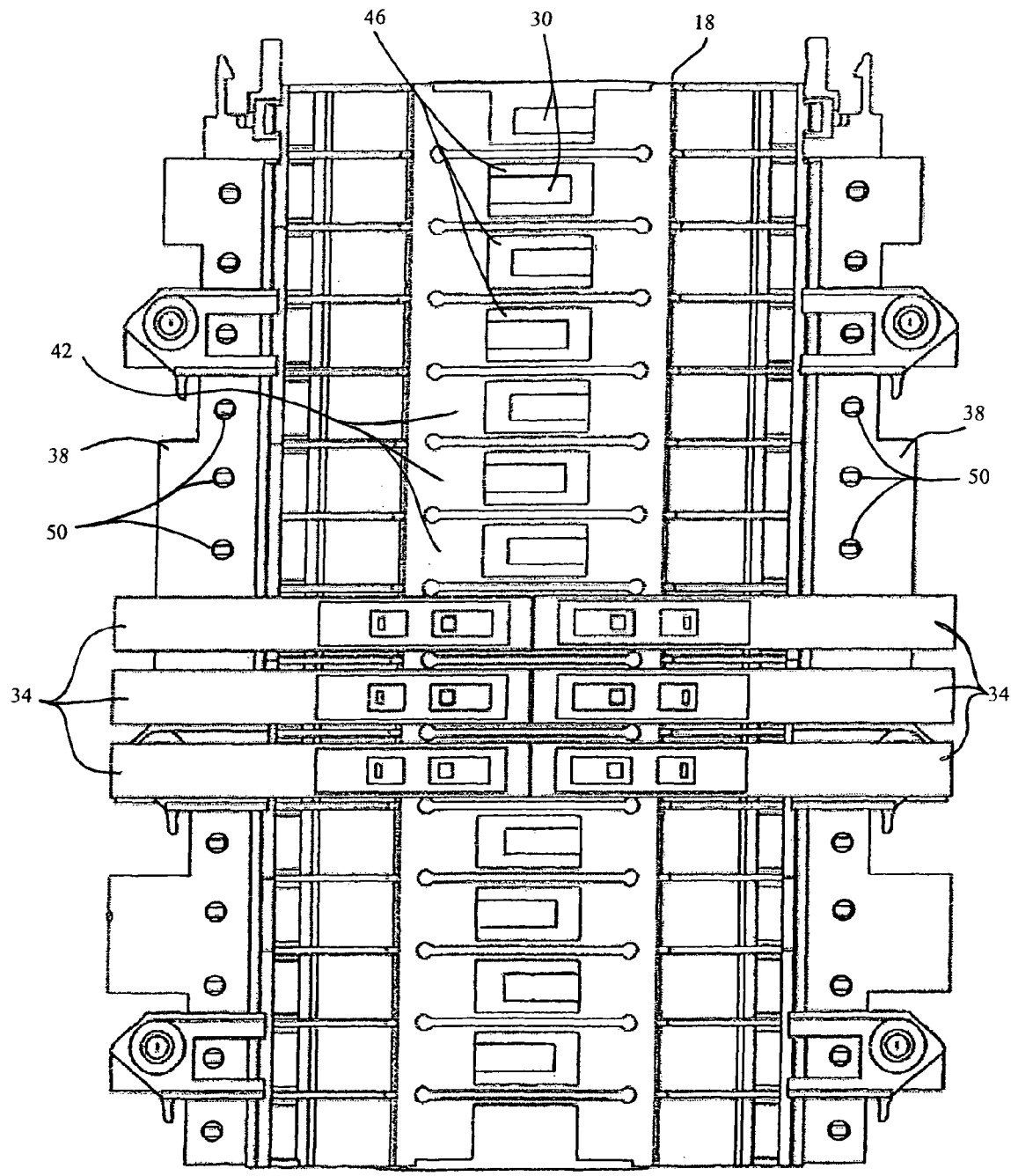
FIG. 2 illustrates a top view a load center interior with a communication strips constructed in accordance with the present invention.

FIG. 2 illustrates a portion of the load center interior 18 in more detail. Here it can be seen that the load center interior 18 defines a number of branch circuit breaker stations 42 for receiving the branch circuit breakers 34. Each station 42 defines a window 46 where a portion of the at least one electrical distribution bus 30 is exposed such that a plug-on type electrical connector (not shown) of the branch circuit breaker 34 can make an electrical connection to the distribution bus 30. The communication strips 38, shown in their assembled position, include a plurality of communication ports 50 for receiving wireless communication from branch circuit breakers 34 having wireless communication capabilities, as will be discussed later. The communication ports 50 are positioned along the communication strip 38 such that when each communication strip 38 is properly assembled with the load center interior 18 each communication port 50 will be in register with or associated with one of the branch circuit breaker stations 42. Each communication port 50 is also positioned in the communication strip 38 such that a portion of the branch circuit breaker 34 installed in its associated branch circuit breaker station 42 will extend over the communication port 50.

Figure 3:
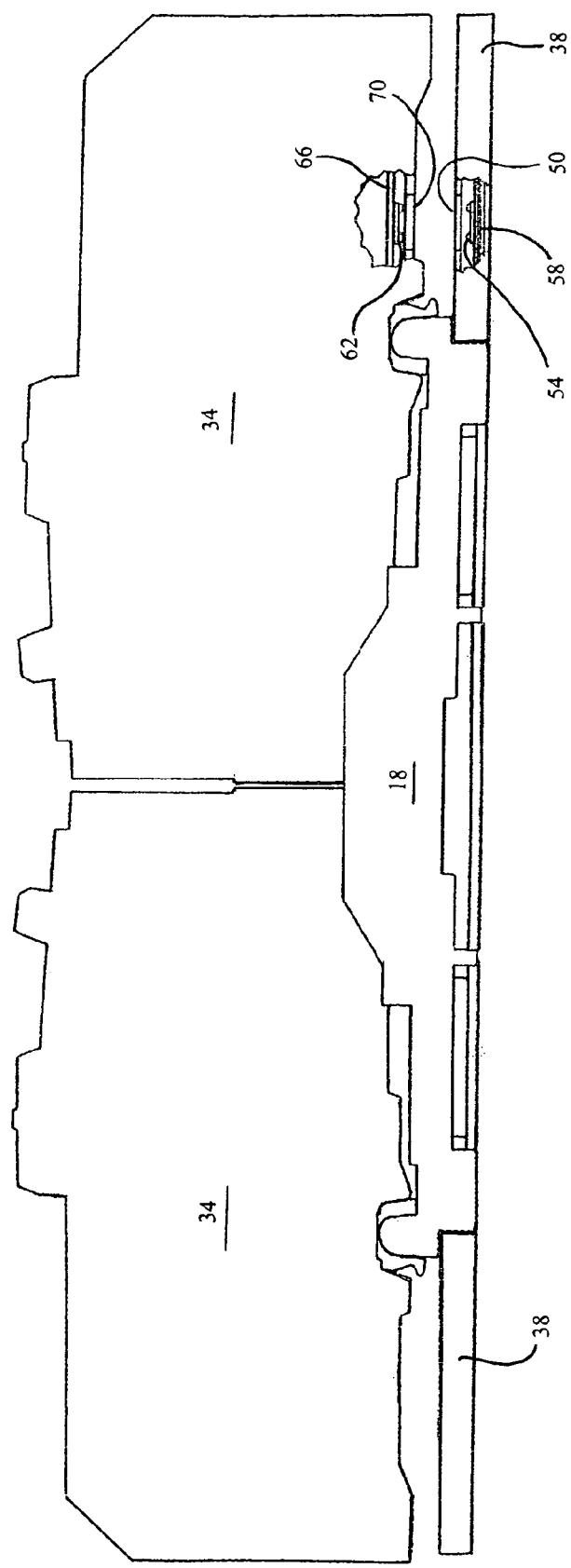
FIG. 3 illustrates an end view a load center interior with captivated communications strips constructed in accordance with the present invention.

FIG. 3 is an end view of the load center interior 18 of FIG. 2 illustrating the spatial arrangement of the communication strips 38 with respect to the load center interior 18 and the installed branch circuit breakers 34. In FIG. 3 a small portion of the communication strip 38 in the vicinity of the communication port 50 has been cut away to show a wireless communication device 54 inside. The wireless communication device 54 is located on a support structure 58 such as a printed wiring board (PWB) and positioned directly below the communication port 50. In this embodiment the communication device 54 is an optical transceiver such as a visible or infrared light emitting diode (LED) transceiver or IrDA transceiver. Other means of wireless communication will be discussed later. The communication port 50 is a transparent window permitting light from the LED transceiver 54 to pass through. A small portion of the branch circuit breaker 34 immediately adjacent the communication port 50 of the communication strip 38 is also cut away to show the wireless communication device 62 of the branch circuit beaker 34, again an optical transceiver such as a visible or infrared light emitting diode (LED) transceiver. The wireless communication device 62 is located on a support structure 66 such as a printed wiring board (PWB) and positioned directly above a transparent communication port 70 in a wall of the branch circuit breaker 34 that will be in juxtaposed position with the communications port 50 of the communication strip 38. This configuration essentially makes the branch circuit breaker 34 a plug-n-play device since the wireless communication connection will be made as soon as the branch circuit breaker 34 is installed in one of the circuit breaker stations 42.

Figure 4:
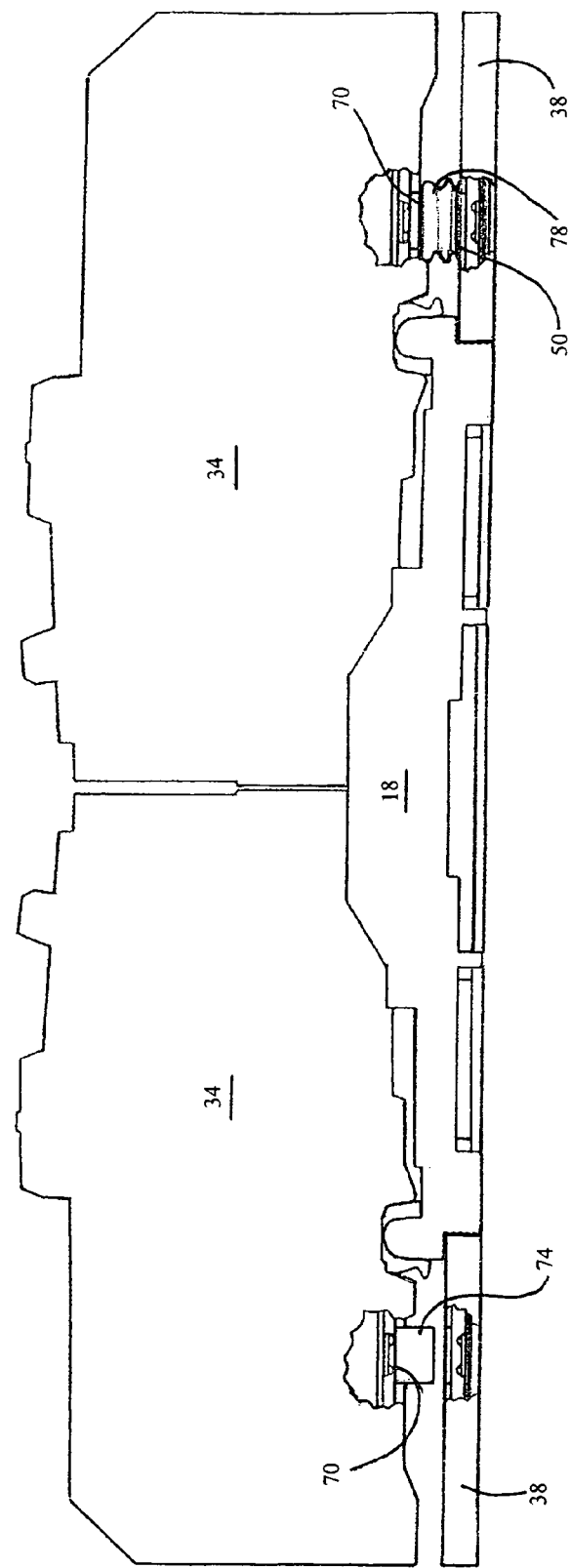
FIG. 4 illustrates an end view of a load center interior with captivated communications strips constructed in accordance with the present invention.

As shown in FIG. 4, when using optical wireless communication devices such as LED transceivers it can be desirable to use a light pipe 74 in the communication port 70 to provide a more direct communication path between the branch circuit breaker 34 and the communication strip 38. It is understood that the light pipe 74 can be attached to either the branch circuit breaker 34 or the communication strip 38. It is also understood that the light pipe 74 can be used inside the branch circuit breaker 34 when the communication device 62 must be positioned away from the outer wall of the branch circuit breaker 34 that is in juxtaposed position with the communications port 50 of the communication strip 38. In some applications it may also be desirable to use a dust boot 78 between the communication port 70 of the branch circuit breaker 34 and the communication port 50 of the communication strip 38.

Figure 5:
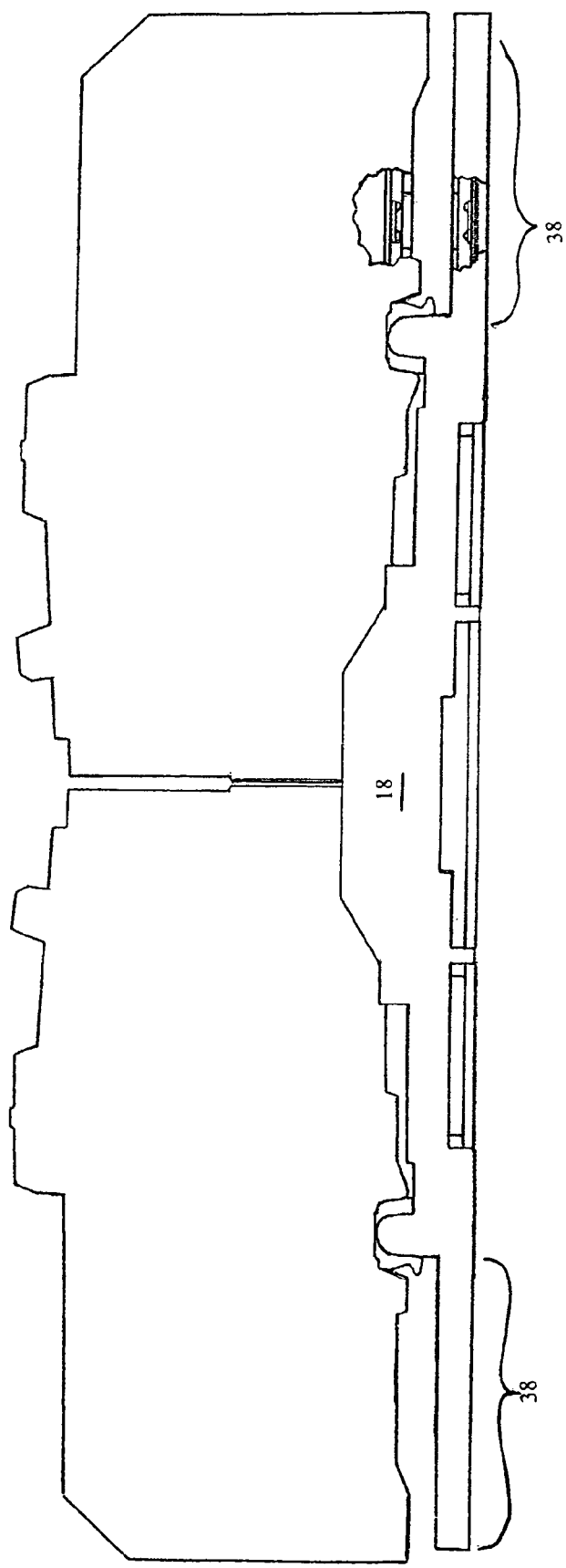
FIG. 5 illustrates an end view of a load center interior with integral communications strip constructed in accordance with the present invention.
Figure 6:
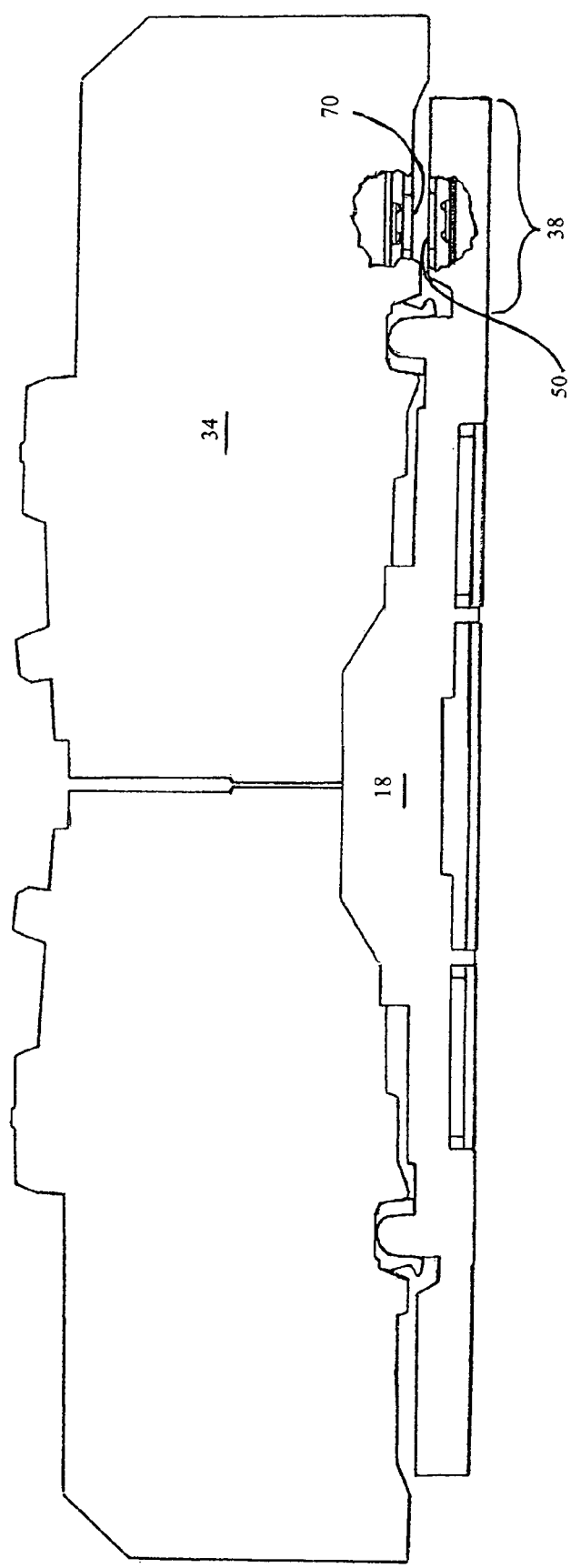
FIG. 6 illustrates an end view of a load center interior with integral communications strip constructed in accordance with the present invention.

FIGS. 5 and 6 illustrate an integrated load center interior 18 in which the communication strip 38 is an integral part of the load center interior 18. In FIG. 6, the communication strip portion 38 of the load center interior 18 is raised to permit more room for electronics and to reduce the distance between the communication port 70 of the branch circuit breaker 34 and the communication port 50 of the communication strip portion 38 of the load center interior 18.

It is to be understood that the communication device 54 is not limited to optical communications methods and that any other bi-directional electrically isolated wireless methods such as ultrasound can be used.

The communications strips 38 can include microprocessors for processing data received from the each of the branch circuit breakers 34 having communications means 54 and/or for controlling those branch circuit breakers 34. The communication strips 38 can also be connected to a controller located either in the load center 10 or at some remote location by any known hard wired or wireless means for remote processing, display, recording and/or control of the branch circuit breakers 34. By remotely processing of information received from the branch circuit breaker 34 the need for a microprocessor or at least a high level microprocessor inside the circuit breaker 34 can be eliminated.

The invention claimed is:

1. A bi-directional circuit breaker communication and control system comprising:
   a load center enclosure;
   a load center interior attached to a back surface of said load center enclosure and defining a plurality of branch circuit breaker stations, each said station providing means for mounting and electrically connecting at least one branch circuit breaker to an electrical distribution bus;
   at least one communications strip lying immediately adjacent said back surface of said load center enclosure and having bi-directional wirelessly communications means for communicating with at least some of said plurality of branch circuit breakers having similar bi-directional wireless communications means as they are mounted in one of said branch circuit breaker stations.

2. The bi-directional circuit breaker communication and control system of claim 1, wherein said bi-directional communications means of said at least one communications strip includes a plurality of communications ports placed at a predetermined intervals such that each branch circuit breaker station is associated with one communications port of said at least one communications strip.

3. The bi-directional circuit breaker communication and control system of claim 2, wherein each said communications port includes an optical transceiver.

4. The bi-directional circuit breaker communication and control system of claim 2, wherein said optical transceiver is a LED transceiver.

5. The bi-directional circuit breaker communication and control system of claim 2, wherein said optical transceiver is an IrDA transceiver.

6. The bi-directional circuit breaker communication and control system of claim 2, wherein each said branch circuit breaker having bi-directional communications means includes a communications port configured to be in justaposed position with one of said communications ports of said communications strip when said branch circuit breaker is installed in a branch breaker station of said load center interior.

7. The bi-directional circuit breaker communication and control system of claim 1, wherein said at least one communications strip is connected to a controller.

8. The bi-directional circuit breaker communication and control system of claim 1, wherein each branch circuit breaker having similar bi-directional communications means and communicating with said communications strip communicates independently of all other branch circuit breakers communicating with said communications strip.

9. The bi-directional circuit breaker communication and control system of claim 1, wherein said at least one communications strip includes at least one microprocessor for processing data received from said branch circuit breakers having bi-directional communications means and/or for controlling said branch circuit breakers having bi-directional communications means.

10. The bi-directional circuit breaker communication and control system of claim 1, wherein said at least one communications strip is at least partially captured between said load center interior and said back surface of said load center enclosure.

11. The bi-directional circuit breaker communication and control system of claim 1, wherein said at least one communications strip is an integral part of said load center interior.

12. The bi-directional circuit breaker communication and control system of claim 2, wherein each said communications port includes a light pipe.

13. The bi-directional circuit breaker communication and control system of claim 2, wherein each said communications port includes a dust boot.

14. A method of communicating with and controlling a circuit breaker in a load center said method comprising the steps of:
- placing at least one communications strip having a plurality of communications ports with wireless bi-directional communications means and at least one microprocessor for processing data and/or controlling branch circuit breakers adjacent a back surface of a load center enclosure;
- attaching a load center interior to said back surface of a load center such that said at least one communications strip is at least partially captured between said load center interior and said back surface of said load center enclosure, said load center interior having a plurality of branch breaker stations each providing means for mounting and electrically connecting a branch circuit breaker to a line bus and being in register with one of said plurality of communications ports of said communications strip;
- installing at least one branch circuit breaker having similar wireless bi-directional communications means in one of said branch circuit breaker stations of said load center interior, said wireless bi-directional communications means of said branch circuit breaker being configured to be in juxtaposed position with one of said communications ports of said communications strip such that bi-directional communications is established during installation of said branch circuit breaker into said branch circuit breaker station.

* * * * *